United States Patent [19]
Ichimura et al.

[11] Patent Number: 5,106,529
[45] Date of Patent: Apr. 21, 1992

[54] SUPERTWISTED NEMATIC LIQUID CRYSTAL DISPLAY DEVICE

[75] Inventors: Yukiko Ichimura, Tenri; Kato Shinji, Nara, both of Japan

[73] Assignee: Sharp Kabushiki Kaisha, Osaka, Japan

[21] Appl. No.: 559,308

[22] Filed: Jul. 30, 1990

[30] Foreign Application Priority Data

Jul. 31, 1989 [JP] Japan ................ 1-200050

[51] Int. Cl.⁵ .................. C09K 19/52; G02F 1/13
[52] U.S. Cl. .................. 252/299.01; 359/102
[58] Field of Search .............. 252/299.01, 299.61, 252/299.63, 299.65, 299.66; 350/350 R, 346, 341; 544/242, 245

[56] References Cited

U.S. PATENT DOCUMENTS 4,533,488  8/1985  Fukui et al. ............... 252/299.61
4,752,414  6/1988  Eidenschink et al. ....... 252/299.61
4,779,960  10/1988  Kozaki et al. ................ 350/346
4,913,530  4/1990  Ichimura et al. ............. 350/341
4,946,986  8/1990  Tamaka ....................... 558/411

FOREIGN PATENT DOCUMENTS 0273443  7/1988  European Pat. Off. .
0316181  5/1989  European Pat. Off. .
0364588  4/1990  European Pat. Off. .

Primary Examiner—Robert L. Stoll
Assistant Examiner—Shean C. Wu
Attorney, Agent, or Firm—Linda M. Buckley; David G. Conlin

[57] ABSTRACT

An improved supertwisted nematic liquid crystal display device which comprises a pair of glass substrates each having an electrode and an orientation film formed on the surface of the electrode, and a liquid crystal composition comprising a specific base liquid crystal and optically active substance added thereto and interposed between the glass substrates so that the liquid crystal molecules have a twist angle $\phi$ of 210° to 270°.

10 Claims, 6 Drawing Sheets $\phi = 240°$
$\beta = 45°$
$\gamma = 45°$ $\phi = 210°$
$\beta = 30°$
$\gamma = 60°$

SUPERTWISTED NEMATIC LIQUID CRYSTAL DISPLAY DEVICE

BACKGROUND OF THE INVENTION

1. Field of the Invention

The present invention relates to supertwisted nematic liquid crystal display devices, and more particularly to supertwisted nematic liquid crystal display devices suited to liquid crystal display of which a high contrast ratio and high-speed responses are required.

2. Description of the Related Art

As typically shown in FIG. 1, conventional nematic liquid crystal display devices are fabricated by forming patterns of transparent electrodes 3, 4 on the lower surface of an upper glass substrate 1 and on the upper surface of a lower glass substrate 2, respectively, from indium oxide, forming a film, for example, of a polyimidosilane high polymer over each electrode and rubbing the surface of the film with a cloth in a given direction to form orientation films 5, 6 and obtain a liquid crystal cell, enclosing a liquid crystal composition in the cell to form a liquid crystal layer 7, and arranging polarizers 8, 9 respectively on the upper side and the lower side of the resulting assembly. The relationship between the rubbing angle and the twist angle of liquid crystal molecules in the liquid crystal display device is such that as seen in FIG. 2, the angle made by the rubbing direction 10 of the upper orientation film 5 and the rubbing direction 11 of the lower orientation film 6 is the same as the twist angle $\phi$ of liquid crystal molecules. The electrooptical characteristics of the liquid crystal display device can be represented, for example, by a voltage-transmittance curve as shown in FIG. 3.

Such a liquid crystal display device of the matrix type is usually driven optimally by the voltage averaging method with N in the number of multiplex driving. At this time, the ratio $\alpha$ of the effective voltage Vrma(ON) on lighted pixels to the effective voltage Vrma(OFF) on pixels which are off is expressed by:

$$\alpha = \frac{Vrma(ON)}{Vrma(OFF)} = \sqrt{\frac{\sqrt{N}+1}{\sqrt{N}-1}}$$

In the above expression, if $N \to \infty$, $\alpha \to 1$. Thus, with an increase in the number N, the difference between Vrma(OFF) and Vrma(ON) decreases. Accordingly, in realizing matrix-type liquid display devices for displaying an increased amount of data, it is required to develop liquid crystal materials having sharp threshold characteristics and improved orientation films in order to obtain a satisfactory contrast ratio even if the voltage difference between Vrma(ON) and Vrma(OFF) is small. In the field of liquid crystal display devices, there is an increasing demand for greater display capacities especially in recent years with an increase in the amount of data to be displayed.

In corresponding relation with the increase in the number N, there is recently a tendency to set the twist angle $\phi$, which is conventionally 90°, to as large as 210° to 270°.

For liquid crystal display devices wherein the liquid crystal molecules have such a great twist angle $\phi$, nematic liquid crystal compositions are used which have incorporated therein an increased amount of optically active substance for inducing a twisted helical structure of liquid crystal molecules. The amount of optically active substance to be used is so adjusted that the ratio of the thickness d of the liquid crystal layer to the resulting helical pitch p of the nematic liquid crystal composition, i.e., d/p, is in the range of $\phi/360 - 0.25 \leq d/p \leq \phi/360 + 0.25$. Incidentally, as the twist angle $\phi$ is increased, the contrast ratio increases (see FIG. 4), hence desirable, whereas the range of d/p values settable without entailing improper orientation (undertwist domain or stripe domain) then tends to become smaller (see FIG. 5).

Especially if the range of d/p values settable decreases to not greater than 0.1, problems will arise in respect of reliability, etc. Attempts have therefore been made to increase the range of settable d/p values by adding an increased amount (e.g., at least 20 wt. %) of components with a strong stripe domain inhibitory effect to liquid crystal compositions for use in supertwisted nematic liquid crystal display devices wherein the liquid crystal molecules have a twist angle of at least 210° (Unexamined Japanese Patent Publications SHO 64-56415 and SHO 64-33522, etc.)

The steepness of electrooptical characteristics of liquid crystal display devices (see, for example, FIG. 3) differs with the cell construction and the liquid crystal composition used. If the steepness is insufficient, the contrast ratio (ratio of transmittance during ON-time to transmittance during OFF-time) is low to render the display difficult to view, whereas excessively steep characteristics give rise to a problem as to the nonuniformity of the display (especially halftone display) due to variations in the cell thickness in the display device. For this reason, the steepness of electrooptical characteristics of a particular liquid crystal display device must be set to a suitable range inherent in the cell structure of that device. For example, in the case of the liquid crystal display device having the cell structure shown in FIGS. 1 and 2 and usually exhibiting the electrooptical characteristics of FIG. 3, it has been found desirable to set the steepness of the characteristics to the range of $1.04 \leq V_{90\%}/V_{10\%} \leq 1.08$.

Recently, there is a tendency to use supertwisted nematic liquid crystal display devices in word processors, lap-top personal computers, family computers, and the like. Especially with personal and family computers which are adapted for scrolling or playing games, the display device to be used must have a high response speed for quick changes of screen images. Nevertheless, conventional supertwisted nematic liquid display devices are low in response speed and therefore still remain to be improved for use in personal or family computers. Moreover, as the contrast ratio is increased to give more distinct display, the response speed generally becomes still lower.

It appears possible to increase the response speed of liquid crystal display devices by reducing the thickness of the liquid crystal layer (cell thickness), but a reduction in the thickness of the liquid crystal layer results in a lower yield, for example, due to the dust problem involved in the process to entail an increased cost, hence undesirable.

The present invention, which has been accomplished to overcome the foregoing problems, provides a supertwisted nematic liquid crystal display device having a high response speed and adapted to give distinct display without entailing a reduced yield (increased cost).

The compounds of the formulae (I) to (VII) for use in the present invention are known as components of liquid crystal compositions. However, no specific liquid crystal composition is known which is prepared from the combination of such components.

SUMMARY OF THE INVENTION

The present invention provides a supertwisted nematic liquid crystal display device which comprises a pair of glass substrates each having an electrode and an orientation film formed on the surface of the electrode, and a liquid crystal composition comprising a base liquid crystal and optically active substance added thereto and interposed between the glass substrates so that the liquid crystal molecules have a twist angle $\phi$ of 210° to 270°, the base liquid crystal comprising 10 wt. % to 35 wt. % of at least one compound represented by the formula (I):

(I)

wherein $R^1$ is a straight-chain or branched-chain alkyl group having up to 10 carbon atoms, 0 to 15 wt. % of at least one compound represented by the formula (II):

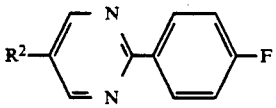
(II)

wherein $R^2$ is a straight-chain or branched-chain alkyl group having up to 10 carbon atoms, 5 wt. % to 20 wt. % of at least one compound represented by the formula (III):

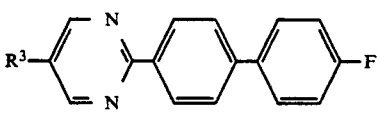
(III)

wherein $R^3$ is a straight-chain or branched-chain alkyl group having up to 10 carbon atoms, 15 wt. % to 35 wt. % of at least one compound represented by the formula (IV):

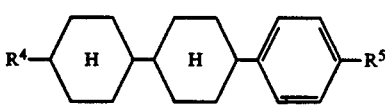
(IV)

wherein $R^4$ and $R^5$ are the same or different and are each a straight-chain or branched-chain alkyl group having up to 10 carbon atoms, 8 wt. % to 25 wt. % of at least one compound represented by the formula (V):

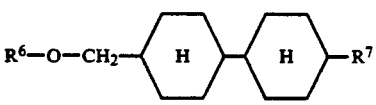
(V)

wherein $R^6$ and $R^7$ are the same or different and are each a straight-chain or branched-chain alkyl group having up to 10 carbon atoms, 10 wt. % to 20 wt. % of at least one compound represented by the formula (VI):

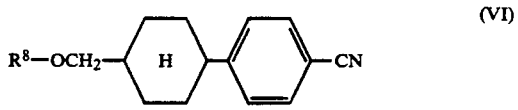
(VI)

wherein $R^8$ is a straight-chain or branched-chain alkyl group having up to 10 carbon atoms, and 0 to 10 wt. % of at least one compound represented by the formula (VII):

(VII)

wherein $R^9$ is a straight-chain or branched-chain alkyl group having up to 10 carbon atoms.

The supertwisted nematic liquid crystal display device of the present invention has a sufficient contrast ratio, a broad d/p margin exhibiting proper orientation and excellent response characteristics.

BRIEF DESCRIPTION OF THE DRAWINGS

FIG. 6 is a diagram showing the relationship between the steepness ($V_{10\%}/V_{90\%}$) of rise characteristics and the response time ($\tau r + \tau d$) as established with use of liquid crystal materials of examples of the invention and comparative examples for the supertwisted nematic liquid crystal display device of FIG. 1 with a liquid crystal twist angle of 240° as shown in FIG. 2a.

DESCRIPTION OF THE PREFERRED EMBODIMENTS

Figure 1:
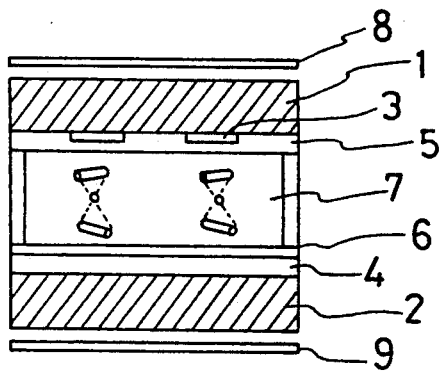
FIG. 1 is a sectional view schematically showing a supertwisted nematic liquid crystal display device.

We have found that (1) a supertwisted nematic liquid crystal device which is free of the foregoing problems and which has a high response speed and a great contrast ratio can be fabricated by using a liquid crystal composition comprising as its base liquid crystal a liquid crystal mixture of specified quantities of compounds of the formulae (I), (III), (IV), (V) and (VI) in combination, and that (2) the device can be given improved low-temperature preservation stability (to remain free of crystallization at low temperatures) which is required especially for transport by air, by further adding compounds of the formulae (II) and (VII) to the liquid crystal mixture. The present invention is based on these findings.

The liquid crystal composition for use in the present invention is prepared by adding small amounts of optically active compound to a base crystal which comprises compounds of the formulae (I), (III), (IV), (V) and (VI) and optional components, i.e., compounds of the formulae (II) and (VII).

Examples of alkyl groups defined for the above formulae are methyl, ethyl, n-propyl, i-propyl, n-butyl, i-butyl, tert-butyl, pentyl, heptyl, hexyl, octyl, decyl, etc., among which $C_1$ to $C_5$ lower alkyl groups are desirable.

The amount of compound of the formula (I) to present in the base crystal is 10 to 30 wt. %, preferably 20 to 30 wt. %. The compound of the formula (III) is used in an amount of 5 to 20 wt. %, preferably 10 to 20 wt. %; the compound of the formula (IV) in an amount of 15 to 35 wt. %, preferably 20 to 30 wt. %; the compound of the formula (V) in an amount of 10 to 25 wt. %, preferably 10 to 20 wt. %; and the compound of the formula (VI) in an amount of 10 to 20 wt. %, preferably 10 to 25 wt. %.

It is desirable to use compounds of the formulae (II) and (VII) as optional components in view of the improvement of low temperature preservation stability. For this purpose, the compound of the formula (II) is used in an amount of up to 15 wt. %, preferably 0 to 10 wt. %, and the compound of the formula (VII) in an amount of up to 10 wt. %, preferably 0 to 7 wt. %.

Optically active compounds which are added to the base liquid crystal can be those already known in the art. These compounds are used in an amount sufficient to give a specified twist angle $\phi$ (210° to 270°, preferably 235° to 245°).

Typical of such optically active compounds are, for example, those represented by the following formulae.

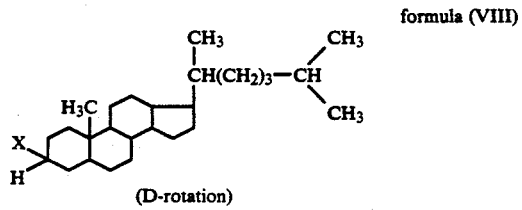

formula (VIII)

(D-rotation)

wherein X is —Cl, —OCOC$_8$H$_{17}$ or —OCO—⟨◯⟩.

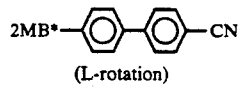
(L-rotation)

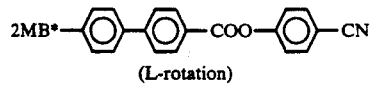
(L-rotation)

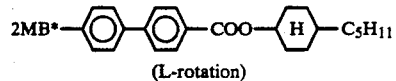
(L-rotation)

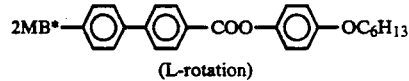
(L-rotation)

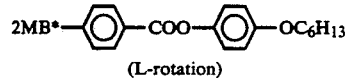
(L-rotation)

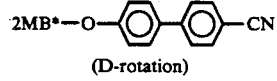
(D-rotation)

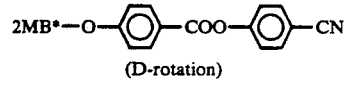
(D-rotation)

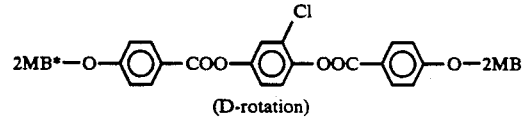
(D-rotation)

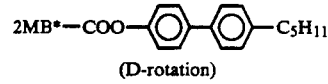
(D-rotation)

wherein 2MB* denotes

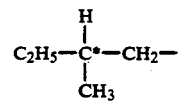

and C* denotes asymmetric carbon atom. Generally these compounds are used in an amount of 0.5 to 3.0 wt. % based on the base liquid crystal.

The electrodes, orientation films, glass substrates, etc. for constituting the device of the invention can be those already known in the art.

EXAMPLES

Test 1

Figure 2A:
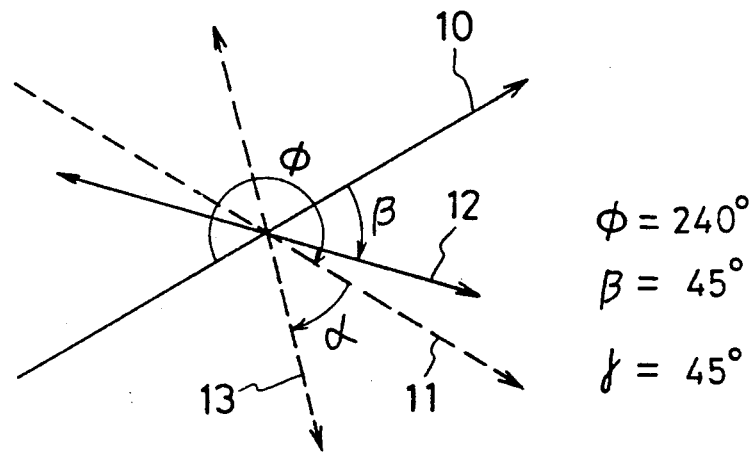
FIGS. 2a and 2b are diagrams illustrating the rubbing angle of orientation films and polarizer setting angles in a supertwisted nematic liquid crystal display device wherein the twist angle of liquid crystal molecules is 240° or 210°.

To investigate nematic liquid crystal compositions exhibiting a low viscosity, liquid crystal compounds from the groups represented by the following formulae A to N were used in combinations, with the proportion of each compound varied from 0 to 40 wt. % with increments or decrements of 5 wt. %, for preparing liquid crystal display devices which had the construction shown in FIG. 1 and wherein the twist angle $\phi$ of liquid crystal molecules was 240° as shown in FIG. 2a. The devices were checked for contrast ratio (steepness of characteristics), response speed, d/p margin affording normal orientation, crystallization temperature in low temperature range, etc.

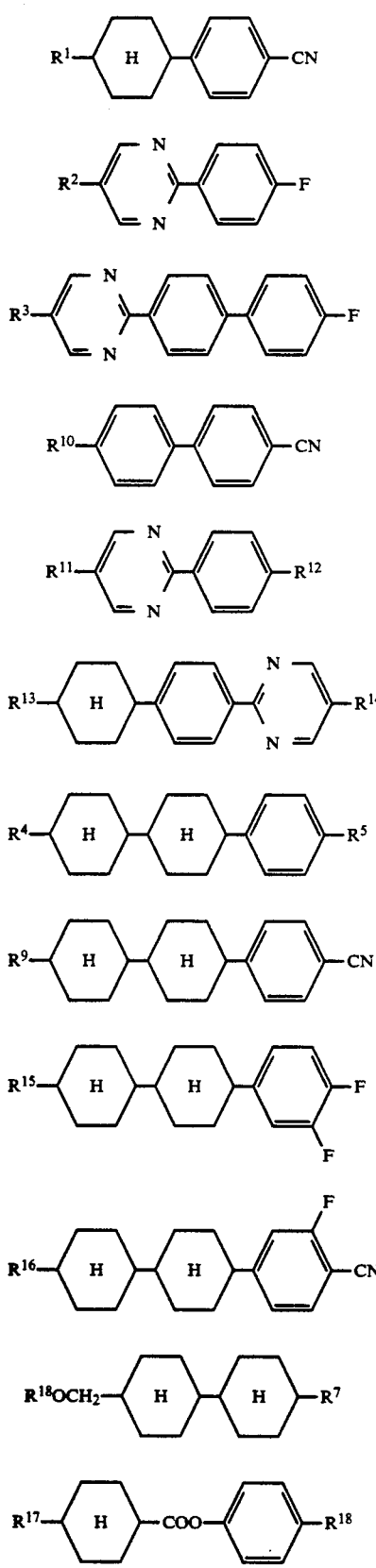

Compound group A

Compound group B

Compound group C

Compound group D

Compound group E

Compound group F

Compound group G

Compound group H

Compound group I

Compound group J

Compound group K

Compound group L

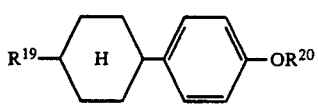

Compound group M

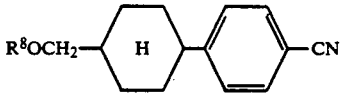

Compound group N

In the above formulae, $R^1$ to $R^{20}$ are the same or different and are each a straight-chain or branched-chain alkyl group having up to 10 carbon atoms. Compounds of the formula (VIII) were used as optically active compounds.

Among the devices thus prepared, those exhibiting characteristics which fulfilled the requirements listed in Table 1 below were identified.

TABLE 1

| Item | Requirement |
|---|---|
| Steepness of characteristics $V_{10\%}/V_{90\%}$ | 1.055 to 1.065 |
| d/p margin giving normal orientation | At least 0.15 |
| Low temperature crystallinity | Not to crystallize at $-25$ degree C |

Of the compositions used for the devices meeting the requirements, the compositions of the following combination afforded very high response speeds.

| Compound group A | 25 wt. % |
| Compound group B | 5 wt. % |
| Compound group C | 15 wt. % |
| Compound group G | 25 wt. % |
| Compound group H | 5 wt. % |
| Compound group K | 10 wt. % |
| Compound group N | 15 wt. % |

Further research we have conducted has revealed that the liquid crystal composition comprising specified proportions of specified compounds for use in the device of the present invention gives a high response speed and a great contrast ratio.

Next, an embodiment of the invention will be described with reference to FIG. 1.

Referring to this drawing, a liquid crystal cell was prepared by forming patterns of transparent electrodes 3, 4 on the lower surface of an upper glass substrate 1 and on the upper surface of a lower glass substrate 2, respectively, from indium oxide, forming high-polymer orientation films 5, 6 of the polyimidosilane type over the respective electrodes 3, 4, and rubbing the surfaces of the films with a cloth in a given direction. Indicated at 8 is an upper polarizer, at 9 a lower polarizer, and at 7 a liquid crystal layer which was formed by injecting the liquid crystal composition to be described later into the cell. The orientation films 5, 6 were formed by applying a 30 wt. % solution of polyamic acid, precursor of a polyimidosilane compound, in N-methylpyrrolidone with a spinner, and heating the resulting coating at 350° C. for 1 hour for ring closure. The solution is prepared by subjecting to condensation 0.1 mole of 1,3-bis(aminopropyl)-tetramethyldisiloxane, 0.9 mole of 4,4'-diaminodiphenyl ether and 1.0 mole of 3,3',4,4'-benzophenonetetracarboxylic anhydride in N-methylpyrrolidone.

Figure 2B:
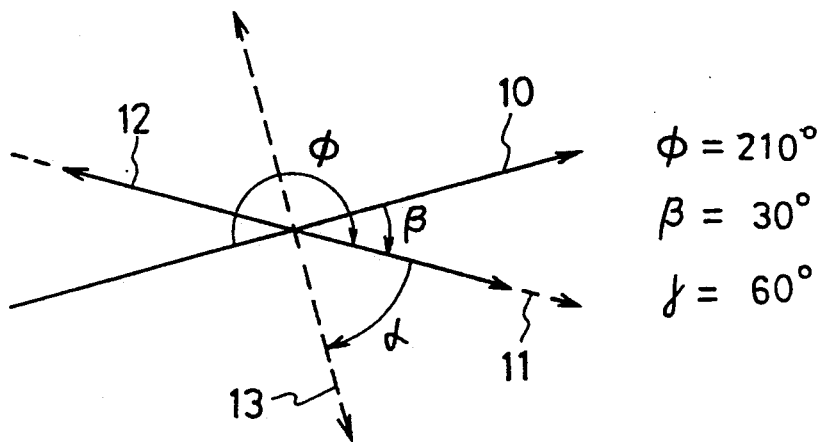
Figure 3:
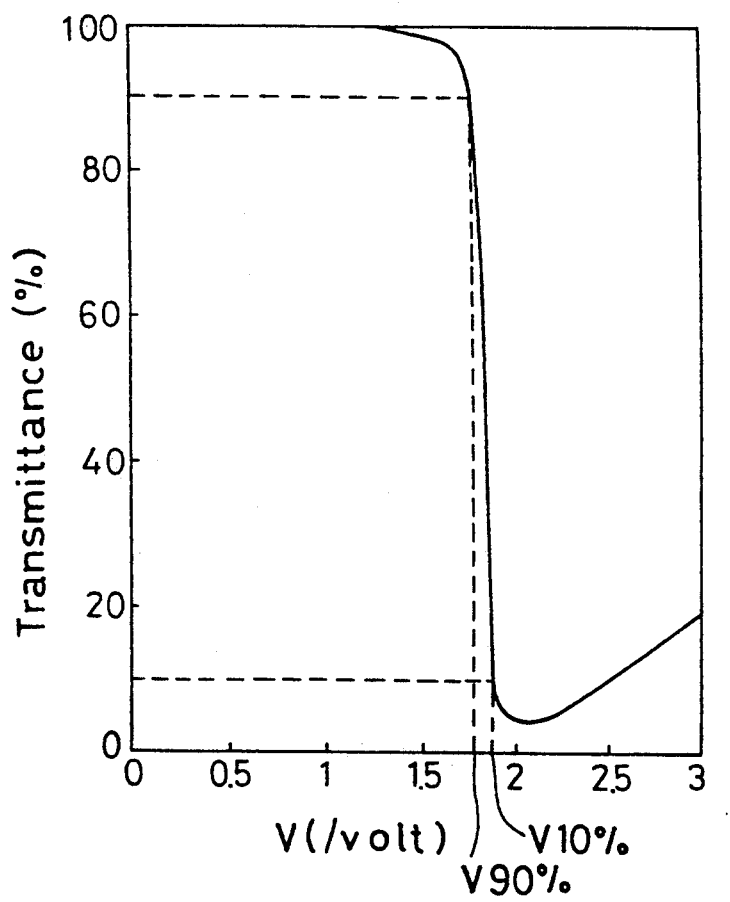
FIG. 3 is a characteristics diagram showing the relationship between TR (light transmittance, %) and V (applied voltage, V) as established for a supertwisted nematic liquid crystal display device prepared as an embodiment of the invention.
Figure 4:
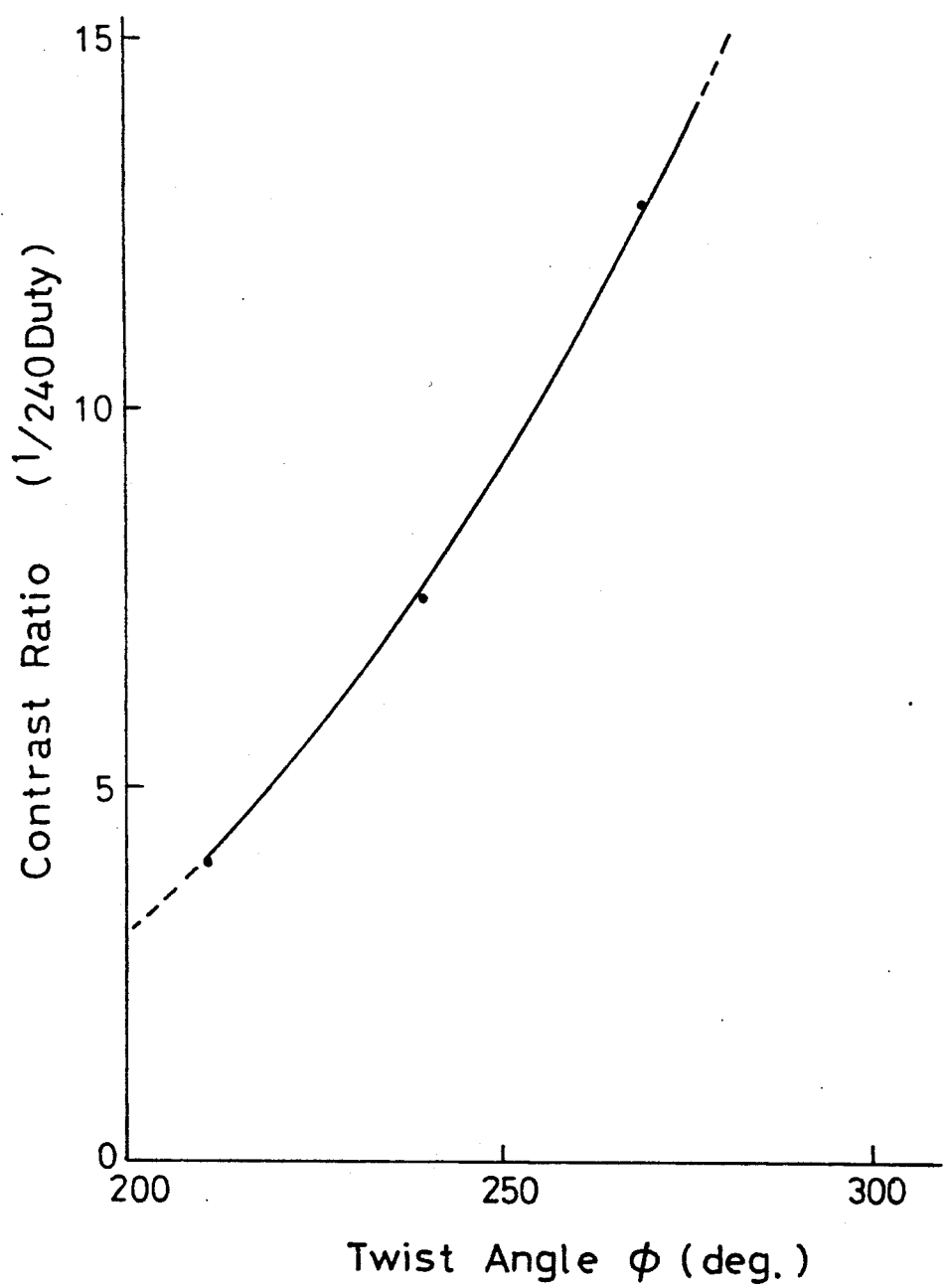
FIG. 4 is a diagram showing the dependence of the contrast ratio on the twist angle $\phi$ of liquid crystal during driving with duty of 1/240 (as determined using PCH type liquid crystal materials, with d/p, i.e., the ratio of cell thickness to the helical pitch length of liquid crystal, fixed to $\phi/360-0.15$)
Figure 5:
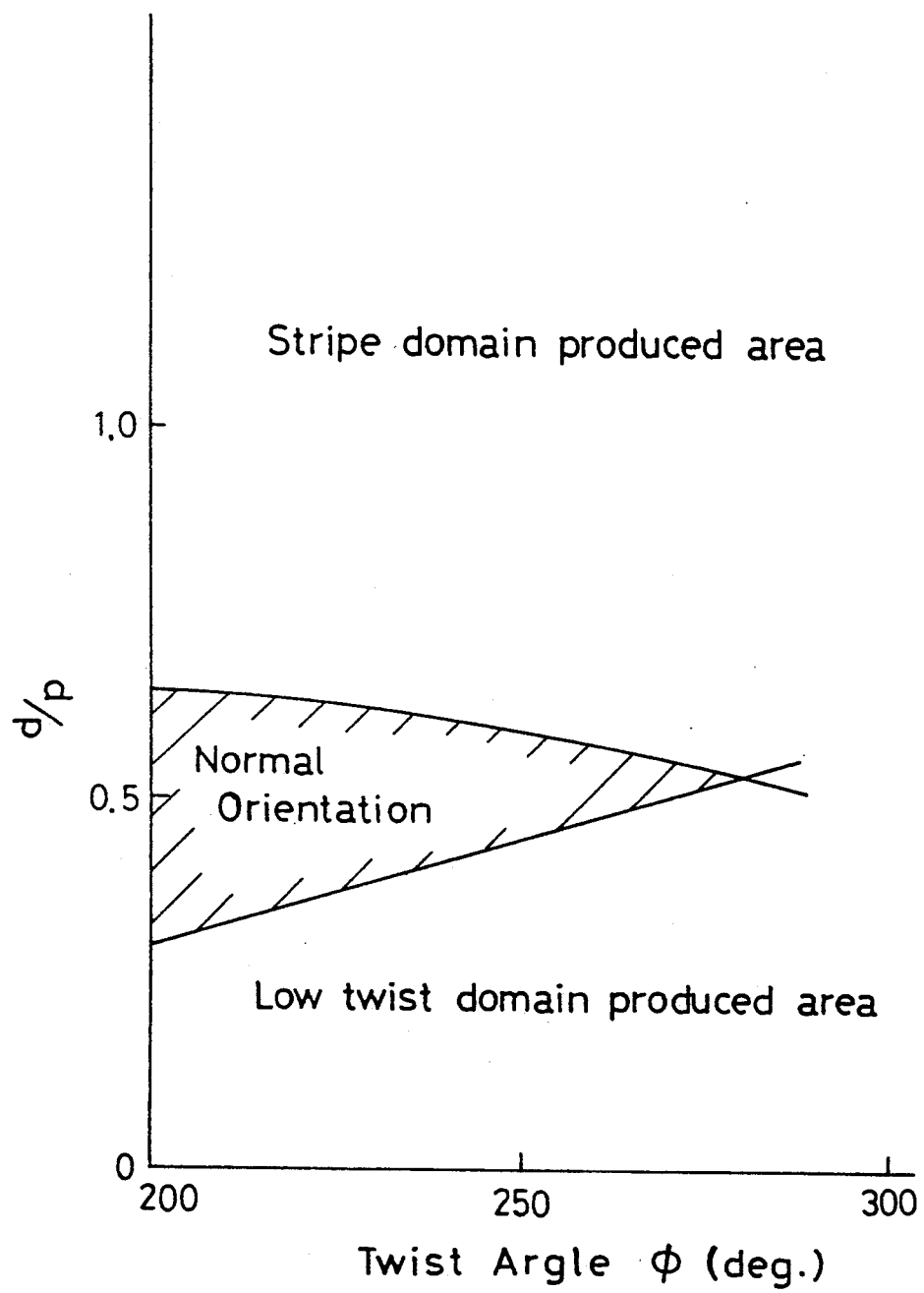
FIG. 5 is a diagram showing the dependence of the d/p range on the twist angle $\phi$ of liquid crystal, exhibiting normal $\phi$ twist orientation.

FIGS. 2a and 2b are diagrams showing the relationship between the rubbing angle and the twist angle of liquid crystal molecules established for the liquid crystal display device of the above construction. With reference to these diagrams, the twist angle φ of liquid crystal molecules is the same as the angle made by the rubbing direction 10 of the upper orientation film 5 and the rubbing direction 11 of the lower orientation film 6. The twist angle φ is dependent on the ratio d/p wherein d is the thickness of the liquid crystal layer, and p is an inherent helical pitch induced by the addition of an optically active substance to a nematic liquid crystal. To make the twist angle φ identical with the angle formed by the rubbing directions of the upper and lower orientation films, the ratio is adjusted to the range of:

$$(\phi/360° - \tfrac{1}{4}) < d/p < (\phi/360° + \tfrac{1}{4})$$

Next, liquid crystal compositions for use in the liquid crystal cell and the characteristics obtained when the compositions were used for liquid crystal display devices will be described below.

EXAMPLE 1

A liquid crystal mixture was prepared from the components listed in Table 2, and was used for fabricating by the above method a supertwisted nematic liquid crystal device wherein the twist angle φ of liquid crystal molecules was 240° and the cell thickness was 7.5 μm. The optically active compound added to the mixture was a compound of the formula (VIII) the same as in the examples to follow, and this compound was used in an amount of 1.40 wt. %.

TABLE 2

| Component | Proportion (wt. %) |
|---|---|
| C$_3$H$_7$—⬡H—⬡—CN | 15 |
| C$_5$H$_{11}$—⬡H—⬡—CN | 10 |
| C$_5$H$_{11}$—(pyrimidine)—⬡—F | 5 |
| C$_2$H$_5$—(pyrimidine)—⬡—⬡—F | 5 |
| C$_3$H$_7$—(pyrimidine)—⬡—⬡—F | 5 |
| C$_4$H$_9$—(pyrimidine)—⬡—⬡—F | 5 |
| C$_3$H$_7$—⬡H—⬡H—⬡—CH$_3$ | 10 |
| C$_3$H$_7$—⬡H—⬡H—⬡—C$_3$H$_7$ | 15 |
| CH$_3$OCH$_2$—⬡H—⬡H—C$_3$H$_7$ | 10 |
| CH$_3$OCH$_2$—⬡H—⬡H—C$_5$H$_{11}$ | 5 |
| CH$_3$OCH$_2$—⬡H—⬡—CN | 10 |
| C$_2$H$_5$OCH$_2$—⬡H—⬡—CN | 5 |

The device obtained had an exceedingly higher response speed and also a higher contrast ratio and was more excellent in the reliability of orientation than the devices of comparative examples to be described later as will be apparent from Table 3.

TABLE 3

| Liquid crystal | Twist angle Φ | V$_{10}$%/V$_{90}$% (1) | Response time (τr, τd) (2) | d/p margin | (Measured at 25° C.) Cell thickness (μm) |
|---|---|---|---|---|---|
| Ex. 1 | 240° | 1.06 | 280 msec, 170 msec | 0.17 | 7.5 |
| Comp. Ex. 1 | 240° | 1.06 | 320 msec, 210 msec | 0.14 | 7.5 |
| Comp. Ex. 2 | 240° | 1.06 | 340 msec, 210 msec | 0.14 | 7.5 |
| Ex. 2 | 210° | 1.06 | 300 msec, 190 msec | 0.18 | 7.5 |
| Comp. Ex. 3 | 210° | 1.06 | 360 msec, 250 msec | 0.18 | 7.5 |
| Comp. | 210° | 1.07 | 330 msec, 200 msec | 0.14 | 7.5 |

TABLE 3-continued

| Liquid crystal | Twist angle Φ | $V_{10\%}/V_{90\%}$ (1) | Response time ($\tau r, \tau d$) (2) | d/p margin | (Measured at 25° C.) Cell thickness (μm) |
|---|---|---|---|---|---|
| Ex. 4 | | | | | |

Notes to Table 3:
(1) The transmittance in the case where the voltage applied to the liquid crystal cell is 0 V is taken as 100%. It has been found that if the ratio $V_{10\%}/V_{90\%}$ is 1.06, a contrast ratio of at least 6 is available at which the images displayed are of satisfactory quality, in the case where the device is driven with duty of 1/240.
(2) The rise time ($\tau r$) and the decay time ($\tau d$) when switching is effected at optimum voltage during 1/240 duty dynamic driving.
(3) Exhibiting normal orientation, producing neither stripe domain nor low twist domain (disclination). The difference between maximum d/p and minimum d/p as measured on the actual panel.

EXAMPLE 2

A liquid crystal mixture was prepared from the components listed in Table 4, and was used for fabricating by the above method a supertwisted nematic liquid crystal device wherein the twist angle φ of liquid crystal molecules was 210° and the cell thickness was 7.5 μm. The optically active compound was used in an amount of 1.20 wt. %.

TABLE 4

| Component | Proportion (wt. %) |
|---|---|
| $C_3H_7$—[H]—[⎔]—CN | 20 |
| $C_5H_{11}$—[H]—[⎔]—CN | 15 |
| $C_2H_5$—[pyrimidine N=N]—[⎔]—[⎔]—F | 5 |
| $C_3H_7$—[H]—[H]—[⎔]—$CH_3$ | 15 |
| $C_3H_7$—[H]—[H]—[⎔]—$C_3H_7$ | 20 |
| $CH_3OCH_2$—[H]—[H]—$C_3H_7$ | 8 |
| $CH_3OCH_2$—[H]—[⎔]—CN | 10 |
| $C_2H_5OCH_2$—[H]—[⎔]—CN | 5 |
| $C_2H_5$—[H]—[H]—[⎔]—CN | 2 |

As will be apparent from Table 3, the device fabricated had a higher response speed than those of the comparative examples to be described below and was excellent in contrast ratio and in the reliability of orientation.

Comparative Example 1

A supertwisted nematic liquid crystal display device was prepared in the same manner as in Example 1 except that the components listed in Table 5 were used for preparing a liquid crystal mixture instead of the components given in Table 2.

TABLE 5

| Component | Proportion (wt. %) |
|---|---|
| $C_3H_7$—[H]—[⎔]—CN | 15 |
| $C_3H_7$—[H]—[⎔(F)]—CN | 10 |
| $C_5H_{11}$—[pyrimidine N=N]—[⎔]—F | 2 |
| $C_2H_5$—[pyrimidine N=N]—[⎔]—[⎔]—F | 4 |
| $C_3H_7$—[pyrimidine N=N]—[⎔]—[⎔]—F | 4 |
| $C_3H_7$—[H]—[H]—[⎔]—$CH_3$ | 10 |

TABLE 5-continued

| Component | Proportion (wt. %) |
|---|---|
| 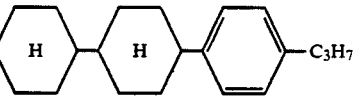 C3H7—H—H—C3H7 | 15 |
| 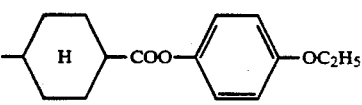 C3H7—H—COO—OC2H5 | 5 |
| 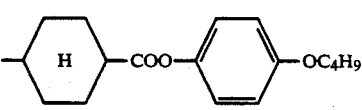 C3H7—H—COO—OC4H9 | 10 |
| 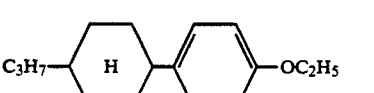 C3H7—H—OC2H5 | 5 |
| 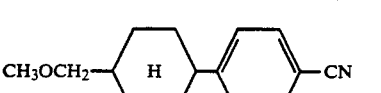 CH3OCH2—H—CN | 10 |
| 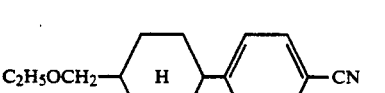 C2H5OCH2—H—CN | 10 |

The device was low in response speed as shown in Table 3.

Comparative Example 2

A supertwisted nematic liquid crystal display device was fabricated in the same manner as in Example 1 except that the components listed in Table 6 were used for preparing a liquid crystal mixture in place of the components given in Table 2.

TABLE 6

| Component | Proportion (wt. %) |
|---|---|
| 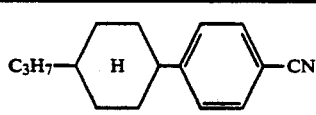 C3H7—H—CN | 20 |
| 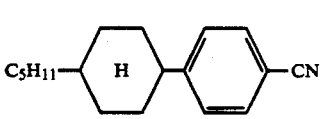 C5H11—H—CN | 15 |
| 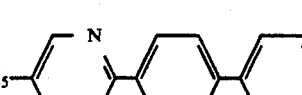 C2H5—N=N—F | 5 |
|  C2H5—H—H—CN (F) | 7 |
| 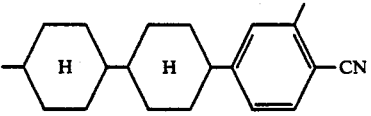 C3H7—H—H—CN (F) | 8 |
|  C2H5—H—H—F,F | 10 |
| 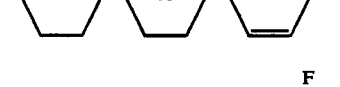 C3H7—H—H—F,F | 10 |
|  CH3OCH2—H—H—C3H9 | 5 |
| 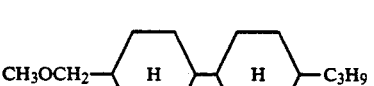 CH3OCH2—H—H—C5H11 | 5 |
|  CH3OCH2—H—CN | 10 |
| 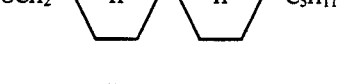 C2H5OCH2—H—CN | 5 |

The device was low in response speed as shown in Table 3.

Comparative Example 3

A supertwisted nematic liquid crystal display device was fabricated in the same manner as in Example 2 except that the components listed in Table 7 were used for preparing a liquid crystal mixture in place of the components given in Table 4.

TABLE 7

| Component | Proportion (wt. %) |
|---|---|
| 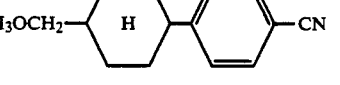 C3H7—H—CN | 20 |
|  C5H11—H—CN | 15 |

TABLE 7-continued

| Component | Proportion (wt. %) |
|---|---|
| C3H7—[H]—[phenyl with N=CH-CH=N ring]—C2H5 | 8 |
| C3H7—[H]—[phenyl with N=CH-CH=N ring]—C3H7 | 8 |
| C2H5—[H]—[H]—COO—[phenyl-F] | 16 |
| C3H7—[H]—[H]—COO—[phenyl-F] | 10 |
| CH3OCH2—[H]—[H]—C3H7 | 8 |
| CH3OCH2—[H]—[phenyl]—CN | 10 |
| C2H5OCH2—[H]—[phenyl]—CN | 5 |

The device was low in response speed as shown in Table 3.

Comparative Example 4

A supertwisted nematic liquid crystal display device was fabricated in the same manner as in Example 2 except that the components listed in Table 8 were used for preparing a liquid crystal mixture in place of the components given in Table 4.

TABLE 8

| Component | Proportion (wt. %) |
|---|---|
| C3H7—[H]—[phenyl-F]—CN | 10 |
| CH3OCH2—[H]—[phenyl]—CN | 20 |
| C2H5OCH2—[H]—[phenyl]—CN | 20 |
| C3H7—[phenyl]—[phenyl]—CN | 5 |
| C5H11—[phenyl]—[phenyl]—CN | 5 |
| C2H5—[pyridazine ring]—[phenyl]—[phenyl]—F | 5 |
| C3H7—[H]—[H]—[phenyl]—CH3 | 15 |
| C3H7—[H]—[H]—[phenyl]—C3H7 | 20 |

The device was low in response speed as shown in Table 3.

Figure 6:
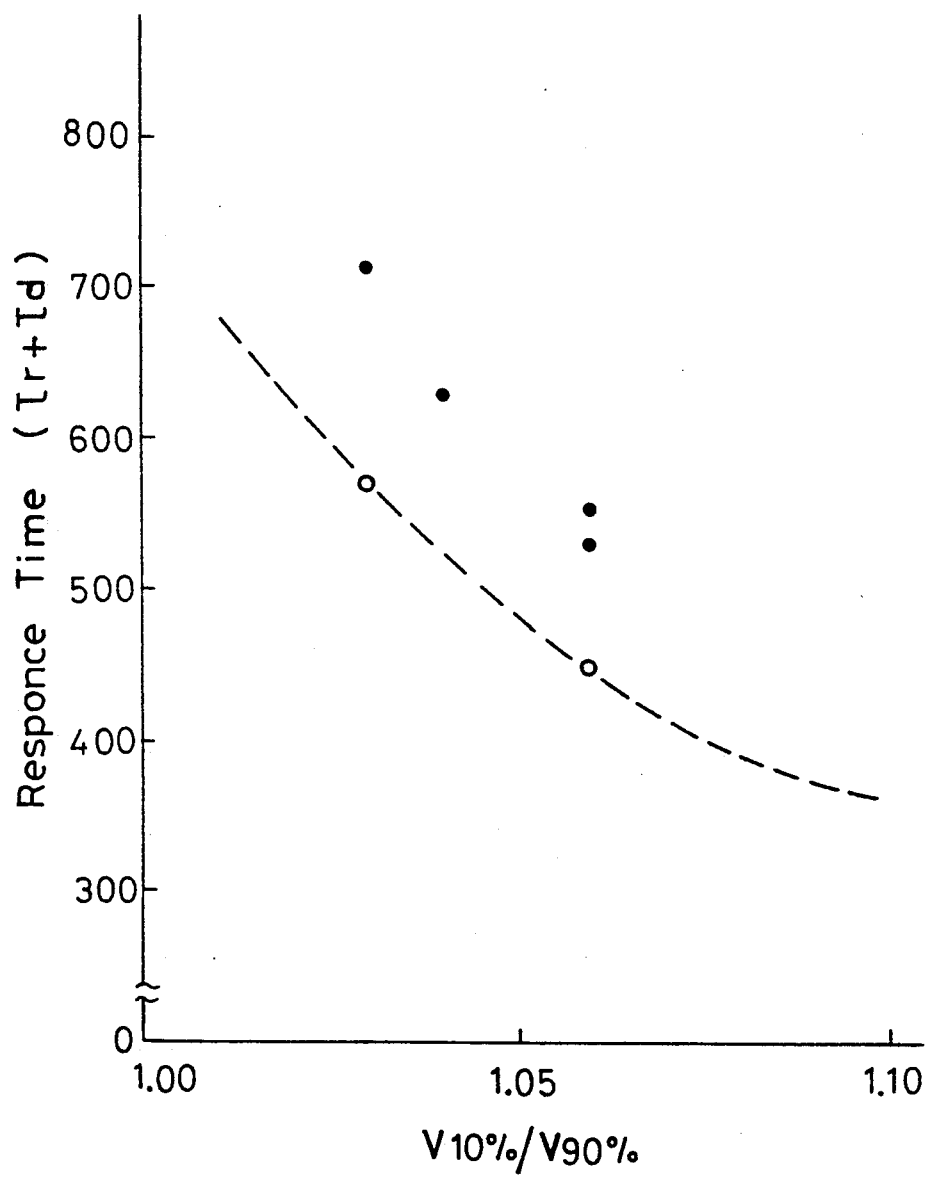
Figure 7:
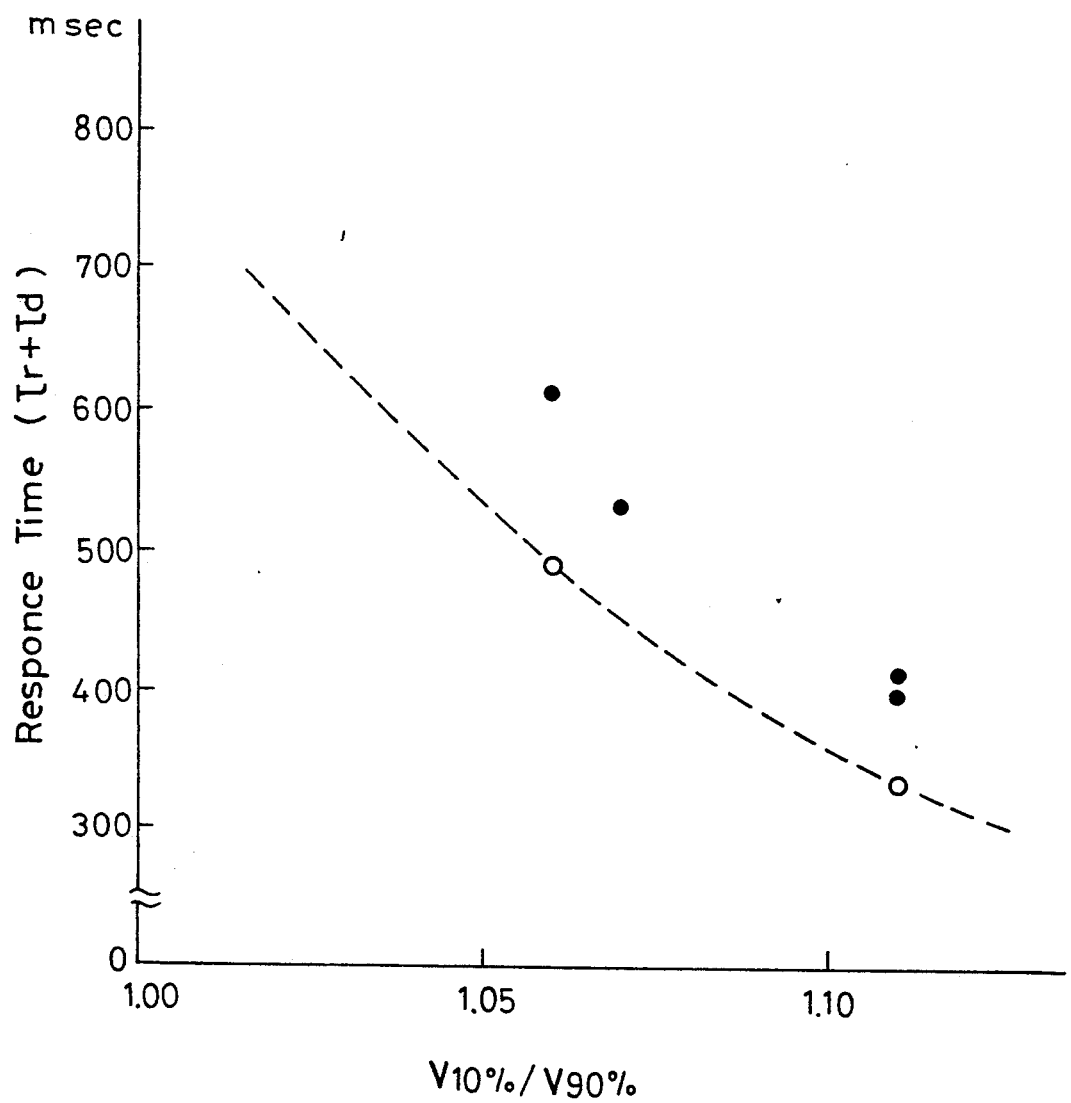
FIG. 7 is a diagram showing the relationship between the steepness ($V_{10\%}/V_{90\%}$) of rise characteristics and the response time ($\tau r + \tau d$) as established with use of liquid crystal materials of examples of the invention and comparative examples for the supertwisted nematic liquid crystal display device of FIG. 1 with a liquid crystal twist angle of 210° as shown in FIG. 2b.

FIG. 6 is a diagram showing the relationship between $V_{90\%}/V_{10\%}$ and the response time (sum of $\tau r$ and $\tau d$) determined for the liquid crystal display devices which had incorporated therein the liquid crystal mixtures of the examples of the invention and the comparative examples and in which the twist angle $\phi$ of liquid crystal molecules was 240°. FIG. 7 is a diagram showing like relationship established for liquid crystal display devices which had incorporated therein the liquid crystal mixtures of the examples and the comparative examples and in which the twist angle $\phi$ was 210° (see FIG. 2b for the rubbing angle and polarizer axis setting angles).

The diagrams show that as the value $V_{90\%}/V_{10\%}$ decreases to increase the steepness of rise of the electro-optical characteristics of the display device, a longer response time tends to result. However, when the liquid crystal mixtures which are alike in steepness are compared, the mixture of the example is shorter in response time and more excellent in characteristics than the mixture of the comparative example. The former is also broader in d/p margin (see Table 3) exhibiting normal orientation and is superior in reliability.

According to the invention described, supertwisted nematic liquid crystal display devices can be provided which are given a satisfactory contrast ratio and a required d/p range with normal orientation without entailing an impaired production yield and which are remarkably improved in response characteristics. Furthermore, the liquid crystal display devices which were fabricated with use of the liquid crystal mixture of the invention and in which the twist angle $\phi$ of liquid crystal molecules was 240° and the thickness of the liquid crystal layer was 7.5 μm exhibited a sufficient contrast ratio, satisfactory response characteristics and reliable orientation free of problems when driven with duty of 1/240.

While the liquid crystal mixture exhibits especially outstanding characteristics when providing liquid crystal devices wherein the twist angle $\phi$ is in the range of $235° \leq \phi \leq 245°$, the mixture similarly exhibits a high contrast ratio and excellent response characteristics when incorporated in devices wherein the angle $\phi$ is in the range of $210° \leq \phi \leq 270°$.

What we claimed is:

1. A supertwisted nematic liquid crystal display device which comprises a pair of glass substrates each having an electrode and an orientation film formed on the surface of the electrode, and a liquid crystal composition comprising a base liquid crystal and optically active substance added thereto and interposed between the glass substrates so that the liquid crystal molecules have a twist angle $\phi$ of 210° to 270°, the base liquid crystal comprising 10 wt. % to 35 wt. % of at least one compound represented by the formula (I):

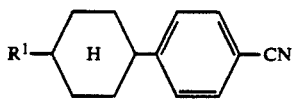

wherein $R^1$ is a straight-chain or branched-chain alkyl group having up to 10 carbon atoms, 0 to 15 wt. % of at least one compound represented by the formula (II):

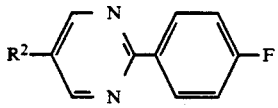

wherein $R^2$ is a straight-chain or branched-chain alkyl group having up to 10 carbon atoms, 5 wt. % to 20 wt. % of at least one compound represented by the formula (III):

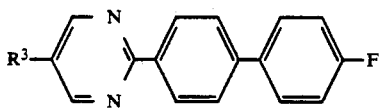

wherein $R^3$ is a straight-chain or branched-chain alkyl group having up to 10 carbon atoms, 15 wt. % to 35 wt. % of at least one compound represented by the formula (IV):

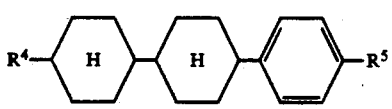

wherein $R^4$ and $R^5$ are the same of different and are each a straight-chain or branched-chain alkyl group having up to 10 carbon atoms, 10 wt. % to 25 wt. % of at least one compound represented by the formula (V):

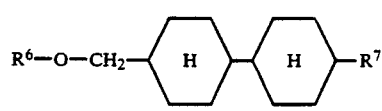

wherein $R^6$ and $R^7$ are the same or different and are each a straight-chain or branched-chain alkyl group having up to 10 carbon atoms, 8 wt. % to 20 wt. % of at least one compound represented by the formula (VI):

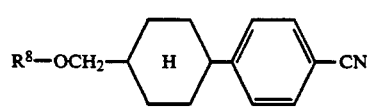

wherein $R^8$ is a straight-chain or branched-chain alkyl group having up to 10 carbon atoms, and 0 wt. % to 10 wt. % of at least one compound represented by the formula (VII):

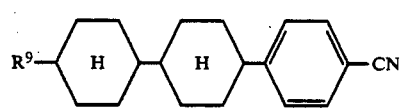

wherein $R^9$ is a straight-chain or branched-chain alkyl group having up to 10 carbon atoms.

2. A liquid crystal display device in accordance with claim 1 in which the content of the compound represented by the formula (I) is 20 wt. % to 35 wt. % in the base liquid crystal.

3. A liquid crystal display device in accordance with claim 1 in which the content of the compound represented by the formula (II) is up to 10 wt. % in the base liquid crystal.

4. A liquid crystal display device in accordance with claim 1 in which the content of the compound represented by the formula (III) is 10 wt. % to 20 wt. % in the base liquid crystal.

5. A liquid crystal display device in accordance with claim 1 in which the content of the compound represented by the formula (IV) is 20 wt. % to 30 wt. % in the base liquid crystal.

6. A liquid crystal display device in accordance with claim 1 in which the content of the compound represented by the formula (V) is 8 wt. % to 20 wt. % in the base liquid crystal.

7. A liquid crystal display device in accordance with claim 1 in which the content of the compound represented by the formula (VI) is 10 wt. % to 20 wt. % in the base liquid crystal.

8. A liquid crystal display device in accordance with claim 1 in which the content of the compound represented by the formula (VII) is up to 7 wt. % in the base liquid crystal.

9. A liquid crystal display device in accordance with claim 1 in which the added amount of the optically active substance is 0.5 wt. % to 3.0 wt. % to the base liquid crystal.

10. A liquid crystal display device in accordance with claim 1 in in which the twist angle $\phi$ of the liquid crystal molecules is adjusted to from 235° to 245°.

* * * * *